May 21, 1968     R. C. MacARTHUR     3,383,914

SKIN FRICTION TRANSDUCER

Filed Oct. 23, 1965

INVENTOR.
Robert C. MacArthur

BY
*Popp and Sommer*
ATTORNEYS

3,383,914
SKIN FRICTION TRANSDUCER

Robert C. MacArthur, Bowmansville, N.Y., assignor to Cornell Aeronautical Laboratory, Inc., Buffalo, N.Y., a corporation of New York
Filed Oct. 23, 1965, Ser. No. 503,516
5 Claims. (Cl. 73—147)

ABSTRACT OF THE DISCLOSURE

A skin friction transducer wherein a shear sensitive element is responsive to the tangential forces generated by a fluid flow parallel to the surface of the element and wherein pressure equalizing apertures are provided in the shear sensitive element to balance the normal pressure forces acting thereagainst.

---

This invention relates to improvements in skin friction transducer devices.

When a fluid is flowing past the surface of a solid object a tangential or shear force is exerted against the body. This is skin friction drag. In addition to the skin friction drag, pressure forces are produced on the body due to the pressure of the fluid. In prior skin friction transducer devices difficulty has been experienced in getting an accurate measure of the skin friction force, this being so because of the effects of pressure on the sensing element. Of course, "pressure" as used herein includes those forces acting normal to a unit area.

It is accordingly a primary object of this invention to provide a skin friction measuring device that is substantially insensitive to pressure.

Another object of the invention is the provision of means to substantially balance the pressure forces acting against the skin friction or shear sensing element.

Figure 1:
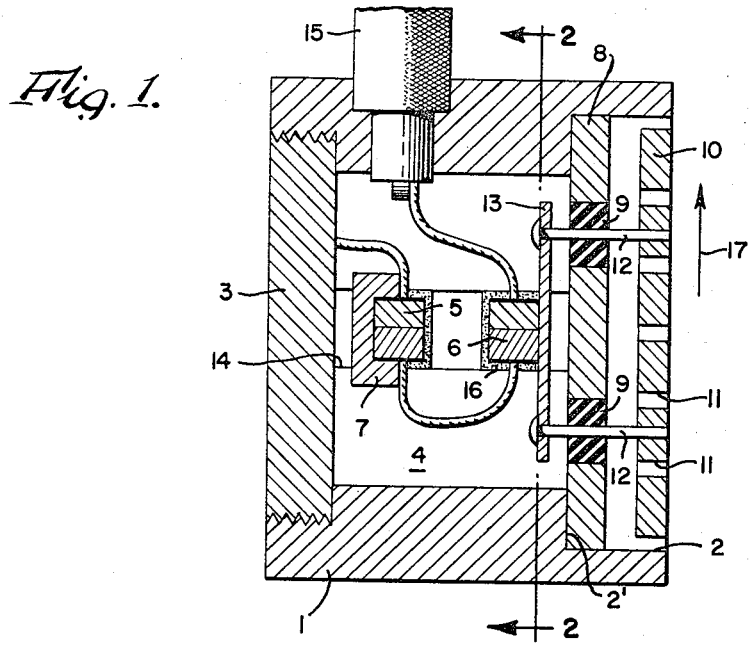
Figure 2:
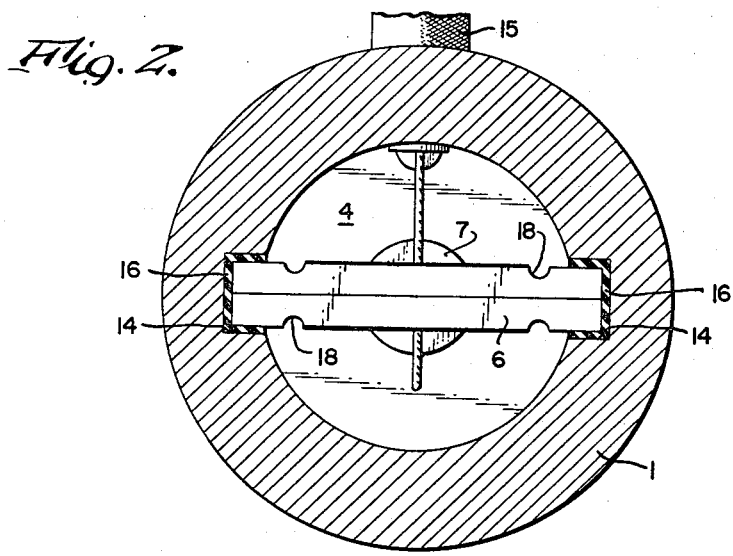

Other objects and advantages of the invention will become apparent from the following detailed description of the same taken in conjunction with the accompanying drawings wherein:

FIG. 1 is a central longitudinal sectional view of a friction transducer device constructed in accordance with the principles of the present invention, and FIG. 2 is a transverse sectional view thereof taken on line 2—2 of FIG. 1.

Referring to FIG. 1, a cylindrical tubular housing 1 is provided having one end counterbored as at 2 to form an outwardly facing annular shoulder 2' and having its other end closed by a screw threaded closure element 3 forming an interior chamber 4. Mounted in chamber 4 is a pair of series connected piezoelectric elements 5 and 6, respectively. These can be standard bar-like crystals which are sensitive to bending. Attached to element 5 is an acceleration compensation mass 7 to be discussed hereinbelow. Sealingly mounted in counterbore 2 against shoulder 2' is a circular support plate 8 containing two holes severally for the reception of two rubber bushing or insert members 9. Alternatively, these members may be attached to a flat surface of plate 8. Also located in counterbore 2 but outwardly of plate 8 and in spaced relation thereto and also to the wall of the counterbore is a shear sensitive disc 10 having a plurality of concentric pressure equalizing apertures 11 passing therethrough. Disc 10 is fixedly attached to piezoelectric element 6 by suitable means shown as including pins or posts 12 which pass severally through the resilient bushings 9 and have their outer ends suitably connected, as by cement, to the disc and have their inner ends suitably connected as by riveting, to a strap 13 which intermediate its ends is connected, as by cement or staking, to element 6.

As shown in FIG. 2 piezoelectric element 6 is retained in housing 1 by having its opposite ends received in and cemented to the walls of a pair of diametrically opposed elongated grooves 14 which extend longitudinally of the housing. To prevent the piezoelectric elements from making contact with the walls of grooves 14 a suitable insulating spacer element 16 may be provided over each end of the piezoelectric element. In a like manner (not shown) piezoelectric element 5 is mounted in housing 1. Piezoelectric element 6 is wired to a shielded output cable 15 and piezoelectric element 5 is grounded to closure element 3, as shown in FIG. 1. Grooves 18 are provided in the piezoelectric elements adjacent each end to enable each of the elements to deflect more like a simple beam.

In operation, assuming flow in the direction of the arrow 17 in FIGURE 1, a tangential shear force is produced on disc 10 moving said disc in a plane parallel to the flow. As is clear, the movement of the disc is a function of the actuating shear force. Since piezoelectric element 6 is rigidly connected with the disc, movement of the disc will cause said element to deflect between its support grooves 14 with tensile stresses on one side thereof and compressive stresses on the other side. As is evident, the resiliency of bushings 9 provide a floating mount for disc 10. Due to the physical characteristics of the piezoelectric element this deflection produces a voltage the magnitude of which is proportional to the deflection. The deflection being a function of the tangential skin friction force, it naturally follows that the voltage is a function of the skin friction force. This voltage signal can be applied by means of cable 15 to suitable recording apparatus (not shown).

In addition to the tangential skin friction force acting on disc 10 in the direction of arrow 17, there are present forces due to the pressure of the fluid. While it is true that this pressure acts in a direction generally normal to the surface of the disc tending to move the same in that direction, it has been found in prior art devices that some tangential movement occurs. In other words, disc 10 may cock due to one bushing 9 supporting its pin 12 in a manner different from that for the other bushing. Any tangential movement of disc 10 caused by pressure will appear erroneously as a shear force measurement. According to the present invention the apertures 11 in the disc 10 permit the space between the disc and support plate 8 to fill readily with pressure fluid. Thus disc 10 is subject to equal and opposite pressure with substantially no resulting normal force thereagainst due to the pressure of the fluid. Therefore disc 10 is rendered substantially insensitive to pressure forces.

The weight of acceleration compensation mass 7 corresponds to the effective weight of disc 10 so that acceleration forces will cause movement thereof corresponding to the movement of disc 10. Piezoelectric elements 5 and 6 are so related and wired to one another that signals produced by simultaneous acceleration movements of mass 7 and disc 10 substantially cancel one another out. Thus there is substantially no erroneous output at cable 15 due to acceleration forces.

With a device constructed in accordance with the present invention sensitivity ratios of skin friction shear pressure to normal pressure on the order of 1000 to 1 have been achieved with substained satisfactory results, whereas in prior devices without the apertured discs, sustained accurate operation with ratios greater than 200 to 1 have not been possible.

It is intended that the present invention is not to be limited to the specific embodiment illustrated but rather by the scope of the appended claims.

What is claimed is:

1. In a skin friction transducer, the combination comprising, a housing, a shear sensitive element mounted on said housing having a surface oriented in a plane parallel to the direction of a relatively flowing fluid, and means providing fluid communication between opposite sides of said shear sensitive element for equalizing the pressure thereacross.

2. The device according to claim 1 wherein said shear sensitive element is mounted for relative movement in said direction with respect to said housing, and further comprising transducer means cooperating with said shear sensitive element to convert said movement of said shear sensitive element into a usable output signal.

3. The device according to claim 2 wherein said shear sensitive element is a disc, and said fluid communication means comprise a plurality of apertures in said disc.

4. The device according to claim 3 wherein said transducer means comprises a piezoelectric material.

5. The device according to claim 1 wherein said housing is closed at one end, has a counterbore at the other end and diametrically opposed grooves, and further comprising a support plate mounted in said counterbore having a pair of holes therethrough, resilient bushings severally arranged in said bores, posts severally extending through said bushings, one end of each post being fixedly attached to said shear sensitive element to support the same in spaced relation to said plate, the other end of each said post being connected to a piezoelectric element, said piezoelectric element being supported in said grooves in such manner that said piezoelectric element is responsive in an electrical sense to movement of said shear sensitive element in said direction, and said fluid communication means include a plurality of pressure equalizing apertures in said shear sensitive element.

References Cited

UNITED STATES PATENTS

| | | | |
|---|---|---|---|
| 2,935,870 | 5/1960 | Lyons | 73—147 |
| 3,304,775 | 2/1967 | Kistler | 73—147 |

DAVID SCHONBERG, *Primary Examiner.*